United States Patent Office 2,696,480
Patented Dec. 7, 1954

2,696,480

POLYMERIC ORGANOPOLYSILOXANES CONTAINING PHENYLENE AND SILANE LINKED SILICON ATOMS

Arthur F. Gordon and Harold A. Clark, Midland, Mich., assignors to Dow Corning Corporation, Midland, Mich., a corporation of Michigan No Drawing. Application October 20, 1951, Serial No. 252,431

5 Claims. (Cl. 260—46.5)

The present invention relates to organosiloxane polymers in which the silicon atoms are linked by oxygen atoms, by phenylene radicals, and by silicon to silicon bonding, and to a method for preparing organosiloxane copolymers containing phenylene linked silicon atoms.

The organosiloxane fluids and resins are now well known commercially available products. In such polysiloxanes all of the silicon atoms are connected only by oxygen atoms. Organosilicon resins in which the silicon atoms are connected by phenylene radicals or by substantially only silicon to silicon bonding are also known. Polymeric organosiloxane fluids or resins containing all three of these types of silicon linkages, however, have not been known heretofore.

It is an object of the present invention to provide new and improved organosilicon fluids and resins in which some of the silicon atoms are linked by oxygen atoms, others by phenylene radicals, and others by silicon to silicon bonding, and to provide a method for the preparation of such products. It is a further object to provide a novel method for the preparation of organosiloxane polymers in which the silicon atoms are linked by oxygen atoms and phenylene radicals.

The present invention particularly relates to a process in which an organohalosilane having the general formula $RCH_3SiX_2$, an organosiloxane polymer containing polymeric units of the formula

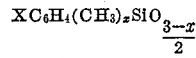

and an alkali metal are reacted in liquid phase. In the above formulae R represents a methyl or phenyl radical, X represents a halogen atom, preferably chlorine or bromine, and $x$ is an integer of from 0 to 1 inclusive. This process results in a product which may be either fluid or resinous in nature, depending upon the reactants and the relative proportions used. The exact complete structure of the products obtained is not completely understood. It is known, however, that the copolymer products contain SiOSi and $SiC_6H_4Si$ types of linkages, and under the proper conditions also contain the polysilane Si-Si linkages. The latter copolymers contain units of the general formulae

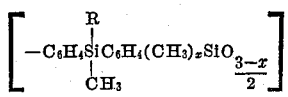

and

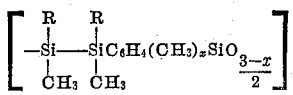

where R is methyl or phenyl and $x$ is 0 or 1. Any other polymeric units present have the formula

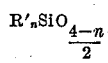

or

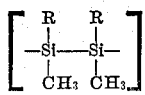

where R' is alkyl, aryl, or halogenated aryl, $n$ is an integer of from 0 to 3 inclusive, and R is methyl or phenyl.

The alkali metal which may be used in this reaction may be any of the well known alkali metals, such as sodium, potassium, caesium, and rubidium. The sodium potassium eutectic mixture may also be employed. It is preferred, due to commercial availability, however, to employ either sodium or potassium.

The organohalosilanes of the formula $RCH_3SiX_2$, where R is methyl or phenyl, are well known and in the case of the chlorosilanes, commercially available materials. Polymers containing units of the general formula

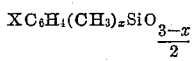

can be prepared, for example, by the hydrolysis and condensation of $XC_6H_4SiX_3$ and/or $XC_6H_4CH_3SiX_2$ or by the cohydrolysis and cocondensation of either or both of these materials with other hydrolyzable silanes, thus producing copolymers. When copolymers are prepared, it is preferred that the other hydrolyzable silanes be of the general formula $R'_nSiX_{4-n}$, where $n$ has an average value of from 0 to 3 inclusive and R' is an alkyl, aryl, or halogenated aryl radical. Preferably, R' is a methyl, phenyl, polyhalophenyl, or haloxenyl radical or mixtures of such radicals. The term "xenyl" is used herein to designate the radical $C_6H_5C_6H_4$—.

Thus, for example, $ClC_6H_4SiCl_3$ and/or $$ClC_6H_4CH_3SiCl_2$$

can be cohydrolyzed with $CH_3SiCl_3$, $(CH_3)_2SiCl_2$, $(CH_3)_3SiCl$, $C_6H_5SiCl_3$, $C_6H_5CH_3SiCl_2$, $C_6H_5(CH_3)_2SiCl$, $Cl_2C_6H_3SiCl_3$, $Cl_7C_{12}H_2SiCl_3$, $Br_2C_6H_3SiCl_3$, and the like or mixtures thereof, to obtain the defined copolymers. The preparation of copolymers of the above type is disclosed in greater detail in the copending application of Fletcher and Hunter, Serial No. 115,783, filed September 14, 1949, and assigned to the assignee of the present invention. The halogenated arylsilanehalides may be prepared by direct halogenation, for example, by the direct chlorination or bromination of $C_6H_5SiX_3$ or $C_6H_5C_6H_4SiX_3$ in the presence of $FeCl_3$ as a catalyst. Silanes of the formula $ClC_6H_4CH_3SiCl_2$ may be prepared, for example, by the reaction of $C_6H_5Cl$ and $CH_3SiHCl_2$ in the presence of $BCl_3$ as a catalyst at a temperature of 150° to 310° C., as described in U. S. Patent No. 2,499,561.

Silicon having no organic substituents attached thereto may also be incorporated in the copolymer by including material such as $SiCl_4$ or $Si(OC_2H_5)_4$ in the mixture of silanes to be hydrolyzed.

Thus, it can be seen that the polymeric organosiloxane employed as a reactant in the present invention can contain, along with the units of the general formula

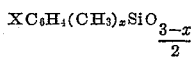

units of the general formula

where R' is an alkyl, aryl, or halogenated aryl radical and may be the same or different radicals, and $n$ is an integer of from 0 to 3 inclusive, preferably from 1 to 3. The copolymer may be either a fluid or a resinous material. If resinous in nature, the polymeric reactant should be soluble in some inert solvent such as benzene or toluene.

Reaction takes place between the $RCH_3SiX_2$, the

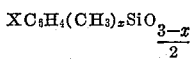

polymeric units, and the alkali metal to produce the alkali metal salt and a copolymer containing SiOSi and $SiC_6H_4Si$ types of linkages. When the $RCH_3SiX_2$ is present in a substantial amount, Si-Si linkages are also formed in the copolymer. Thus novel copolymers may be produced containing all three of the above types of linkages.

These copolymers contain polymeric units of the general formulae

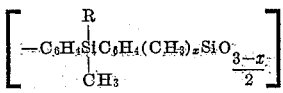

and

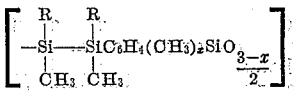

in which R is methyl or phenyl and x is 0 or 1. These units may be linked to one another and/or to siloxane units of the general formula

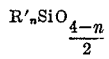

where R' is alkyl, aryl, or haloaryl, preferably methyl, phenyl, halophenyl, or haloxenyl, and $n$ is an integer of from 0 to 3 inclusive. Any of the above units may also be linked to units of the general formula

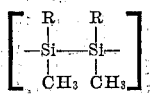

The relative proportions of the reactants are not critical, and any ratio may be employed. Ordinarily, however, the molar ratio employed of $RCH_3SiX_2$ to

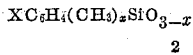

units ranges from about 20 to 1 to about 0.05 to 1, and the product obtained can be varied from a resinous type to a fluid type anywhere within that range.

The amount of alkali metal employed is also not critical, but it does control the amount of phenylene linkages or Si-Si linkage obtained in the product. Amounts of alkali metal equivalent to, or slightly in excess of, the total halogen present should be used to obtain the maximum amount of phenylene and Si-Si linkages possible in a given system. Any lesser amount can be employed, however, resulting in a comparatively smaller amount of such linkages in the system and consequently larger amounts of unreacted halogen.

For example, when a large molar excess of $RCH_3SiX_2$ is present and at least enough of the alkali metal is used to be equivalent to all of the halogen present in the system, a copolymeric siloxane is obtained which contains relatively large amounts of Si-Si linkages and relatively small amounts of phenylene linkages. If smaller amounts of the alkali metal are used, less Si-Si linkages are produced and a quantity of unreacted $RCH_3SiX_2$ may remain in the system, or polymeric units end-blocked with $-SiRCH_3Cl$ may be obtained, which can be converted by hydrolysis to a siloxane type of unit.

When a comparative excess of

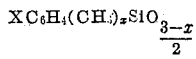

units are present in the system, a different type of polymer is produced. If this excess is large enough, there may be little or no Si-Si linkages produced, and the copolymer may contain only SiOSi and $SiC_6H_4Si$ types of linkages. In this type of a reaction, it is preferred that the alkali metal be employed in an amount about equivalent to the $RCH_3SiX_2$.

The latter type of reaction has been found particularly useful in increasing the viscosity of fluid siloxane copolymers containing $X_2C_6H_3SiO_{3/2}$ units. It has been found extremely difficult to prepare higher viscosity copolymers containing, for example, $(CH_3)_2SiO$, $(CH_3)_3SiO_{1/2}$, and $X_2C_6H_3SiO_{3/2}$ units. Such copolymers are very important as lubricants, and a range of viscosities is highly desirable. The $X_2C_6H_3-$ radical attached to Si, however, does not react with the alkali metal. Hence, it is possible to incorporate $XC_6H_4SiO_{3/2}$ or $XC_6H_4CH_3SiO$ units in the above copolymer, and react the copolymer with $RCH_3SiX_2$ and an alkali metal, thus producing a higher viscosity material but leaving the $X_2C_6H_3SiO_{3/2}$ units unreacted.

An inert diluent, such as a hydrocarbon solvent, may be used in the process of the present invention if desired. The reaction may be conducted at any convenient temperature, but it is preferred to operate at about the melting point of the alkali metal in order to speed up the reaction. Thus, if a diluent is employed, it is preferable that it have a boiling point high enough to allow the alkali metal to melt, thus avoiding any necessity for operating under pressure. Reaction rates at lower temperatures may be speeded up by using the alkali metal in a finely divided form.

Resinous copolymers prepared in accordance herewith are of utility as electrical insulating varnishes, laminating resins, protective coatings, water repellents, and the like. Fluids prepared in accordance herewith are useful as lubricating fluids, hydraulic fluids, damping fluids, etc.

The following examples are illustrative only. All parts given are parts by weight.

*Example 1*

A quantity of $ClC_6H_4CH_3SiCl_2$ was reacted with an excess amount of ethanol and the reaction product distilled, yielding the pure product $ClC_6H_4CH_3Si(OC_2H_5)_2$. This ethoxylated product was hydrolyzed by adding it to an excess of water. The hydrolyzate mixture was refluxed in toluene for about 4 hours. The toluene solution of product was separated from the excess water present and then all volatiles were removed from the toluene solution by strip distilling the solution to a pot temperature of 155° C. at a pressure of about 40 mm. Hg. This produced a polymer containing the polymeric units $(ClC_6H_4CH_3SiO)$. A mixture of 51.2 parts (0.3 mol) of this polymer and 516 parts (2.7 mols) $C_6H_5CH_3SiCl_2$ was added to 135 parts (5.7 mols plus 3 per cent excess) of molten sodium in 2000 parts of refluxing toluene. The reaction proceeded without the further application of heat. When the addition was complete, the reaction product was refluxed for two hours and then 22 parts chlorobenzene were added to kill off the excess sodium. The reaction mixture was cooled to 80° C. and then dumped into 1000 parts of hot water. A white powder resulted that was insoluble in toluene. The reaction product was divided into two portions by filtering off the white powder. The filtrate consisted of a toluene layer and a water layer. The toluene layer was separated, filtered and strip distilled to remove a portion of the solvent present, giving a 30 per cent solids solution of a resin which was found to cure to a tack-free condition after being heated for about 1 hour at 250° C. This resin was tough and remained flexible for more than 100 hours at 250° C. This resin was a copolymer containing units of the general formulae

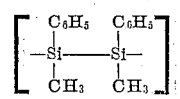

and

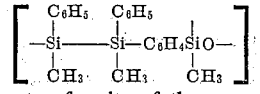

with small amounts of units of the general formula

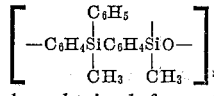

The white powder obtained from the original filtration was washed with water and dried with acetone, giving an insoluble material which was found to have a chloride content of 4.8 per cent by weight. A portion of this powder was molded at a temperature of 250° C. for 30 minutes under a pressure of 8000 p. s. i. The molded material was very hard, shiny, and marble-like.

*Example 2*

A mixture of 25.6 parts (0.15 mol) of the polymeric $(ClC_6H_4CH_3SiO)$ prepared in Example 1 and 544 parts (2.85 mols) $C_6H_5CH_3SiCl_2$ was added to 138.5 parts sodium (5.85 mols plus 3 per cent excess) in 2000 parts of refluxing toluene. The reaction mass was refluxed for two hours and then 22 parts chlorobenzene added. The reaction product was filtered and the solid product obtained was washed with water to remove all salts, giving 21.5 parts of an insoluble material similar to that obtained in Example 1. The toluene soluble portion of the reaction product was washed and concentrated to a 31.5 per cent solids solution. This material can be applied to copper wire and cured at 250° C. to give a tough, flexible coating thereon.

*Example 3*

Example 1 was repeated but the procedure was reversed in that the sodium was added to the mixture of toluene, silane and siloxane. Approximately the same amount of insoluble material was isolated as was obtained in Example 2. The toluene soluble portion of the reaction product was heat bodied for 4½ hours at 200° to 210° C. with air bubbling through the mixture. 217.8 parts of toluene soluble resin were obtained, having a chlorine content of 1.83 per cent by weight. A toluene solution of this resin was cured at 250° C., giving a product which remained flexible for more than 100 hours at 250° C. and which showed no thermal cracking after more than 450 hours at 250° C.

*Example 4*

A quantity of $ClC_6H_4CH_3SiCl_2$ was mixed with toluene and hydrolyzed by adding it to an excess of water. The hydrolyzate was refluxed and then the organic layer was separated from the aqueous HCl layer and washed free of acid. Volatiles were stripped off, leaving a polymeric material having polymer units of the formula $(ClC_6H_4CH_3SiO)$. This polymer had a viscosity of 11,080 cks. at 25° C. and a chlorine content of 19.4 per cent by weight. 200 parts of this polymer were mixed with 200 parts toluene and the mixture heated to reflux. A small amount of water was removed by means of a water trap from the refluxing toluene. The refluxing was continued until no more water appeared. After cooling slightly, 9.07 parts of $(CH_3)_2SiCl_2$ were added, then at reflux, 6.48 parts of sodium were added. After the reaction was apparently complete, the reaction mixture was refluxed for an additional 30 minutes. The reaction mixture was dumped into dilute HCl, then filtered and the toluene layer separated from the aqueous HCl layer. The toluene layer was neutralized by agitating it with $CaCO_3$ and was then refiltered and stripped of all volatiles by distilling the material to a pot temperature of 205° C. at a pressure of about 40 mm. Hg 181 parts of a high viscosity residue were obtained. This product had a viscosity of about 110,000 cks. at 25° C. and a chlorine content of 18.27 per cent by weight.

*Example 5*

A copolymer was prepared by mixing 5 molar per cent $Cl_2C_6H_3SiCl_3$, 5 molar per cent $ClC_6H_4CH_3SiCl_2$, 5 molar per cent $(CH_3)_3SiCl$ and 85 molar per cent $(CH_3)_2SiCl_2$ and hydrolyzing the mixture in an excess of water. The reaction mixture was heated at reflux for several hours and the product layer then separated from the aqueous HCl and washed free of acid. The product was stripped of volatiles to a pot temperature of 265° C. at a pressure of 1 mm. Hg. The residue was found to have a viscosity of 217.7 cks. at 25° C and a chlorine content of 6.65 per cent by weight. 600 parts of this fluid copolymer were mixed with 600 parts of toluene and refluxed to azeotrope out free water. 10.9 parts of $(CH_3)_2SiCl_2$ were then added, followed by 7.77 parts of sodium. All of the sodium appeared to have been reacted in 3 hours time. An additional 1 part of $(CH_3)_2SiCl_2$ was then added and the whole mixture poured into dilute aqueous HCl. The solvent layer was separated and stirred with about 55 parts of $CaCO_3$, then filtered and strip distilled to a pot temperature of 250° C. at about 2 mm. Hg. The resulting fluid had a viscosity of 242.5 cks. at 250 C. and still contained 6.5 per cent by weight chlorine.

*Example 6*

The procedure of Example 5 was repeated except that 30 parts of $(CH_3)_2SiCl_2$ and 19.4 parts of sodium were employed. The reaction product was finished off as in Example 5. The resulting product had a viscosity of 280 cks. at 25° C. and contained 6.16 per cent chlorine by weight.

*Example 7*

The procedure of Example 5 was repeated except that in place of the $(CH_3)_2SiCl_2$, 42.5 parts of $C_6H_5CH_3SiCl_2$ were employed and the amount of sodium used was 15.55 parts. The reaction product was finished off as in Example 5, resulting in a fluid which had a viscosity 345.5 cks. at 25° C. and a chlorine content of 6.16 per cent by weight.

*Example 8*

When Example 5 is repeated, using 13.2 parts of potassium in place of the sodium, the fluid product obtained is similar to that obtained in Example 5.

*Example 9*

When a copolymer is prepared by hydrolyzing a mixture of 5 molar per cent $Cl_2C_6H_3SiCl_3$, 5 molar per cent $BrC_6H_4SiCl_3$, 10 molar per cent $(CH_3)_3SiCl$ and 80 per cent $(CH_3)_2SiCl_2$, the viscosity of the resulting fluid is increased by reacting the copolymeric organosiloxane with $(CH_3)_2SiCl_2$ and sodium as in Example 5.

*Example 10*

A copolymeric organosiloxane was prepared by co-hydrolyzing a mixture of 2 molar per cent heptachloroxenyltrichlorosilane, 5 molar per cent $ClC_6H_4CH_3SiCl_2$, 5 molar per cent $(CH_3)_3SiCl$ and 88 molar per cent $(CH_3)_2SiCl_2$. The viscosity of this copolymer is materially increased by reacting it, as in Example 5, with $(CH_3)_2SiCl_2$ and sodium.

That which is claimed is:

1. The process comprising reacting in liquid phase an organosilane of the general formula $RCH_3SiX_2$, in which R is a radical selected from the group consisting of methyl and phenyl radicals and X represents a substituent selected from the group consisting of chlorine and bromine atoms, an organosiloxane polymer containing polymeric units of the general formula $$XC_6H_4(CH_3)_xSiO_{\frac{3-x}{2}}$$

where $x$ is an integer of from 0 to 1 inclusive, and X is as above defined, and an alkali metal, whereby there is produced an organosiloxane copolymer in which some of the silicon atoms are linked by oxygen atoms and some of the silicon atoms are linked by phenylene radicals.

2. The process of claim 1 in which the alkali metal is selected from the group consisting of sodium and potassium.

3. The process which comprises reacting in liquid phase an organosilane of the general formula $RCH_3SiCl_2$ where R is a radical selected from the group consisting of methyl and phenyl radicals, an organosiloxane polymer containing polymeric units of the general formula $$ClC_6H_4(CH_3)_xSiO_{\frac{3-x}{2}}$$

in which $x$ is an integer of from 0 to 1 inclusive, and sodium, whereby there is produced an organosiloxane copolymer in which some of the silicon atoms are linked by oxygen atoms and some of the silicon atoms are linked by phenylene radicals.

4. The process comprising reacting in liquid phase an organosilane of the general formula $R(CH_3)SiX_2$ where R is a radical selected from the group consisting of methyl and phenyl radicals and X is a substituent selected from the group consisting of chlorine and bromine atoms, an organosiloxane copolymer containing polymeric units of the general formulae $$XC_6H_4(CH_3)_xSiO_{\frac{3-x}{2}}$$

and $$X_2C_6H_3SiO_{3/2}$$

where $x$ is an integer of from 0 to 1 inclusive and X is as above defined, and an alkali metal whereby there is produced an organosiloxane copolymer in which some of the silicon atoms are linked by oxygen atoms and some of the silicon atoms are linked by phenylene radicals and in which the $X_2C_6H_3SiO_{3/2}$ units remain unreacted.

5. The process of claim 4 in which the alkali metal is selected from the group consisting of sodium and potassium.

References Cited in the file of this patent

UNITED STATES PATENTS

| Number | Name | Date |
| --- | --- | --- |
| 2,258,219 | Rochow | Oct. 7, 1941 |
| 2,507,515 | Clark | May 16, 1950 |